(12) United States Patent
Kuratomi

(10) Patent No.: US 8,491,130 B2
(45) Date of Patent: Jul. 23, 2013

(54) PROJECTION DISPLAY APPARATUS HAVING PLURAL LIGHT SOURCES

(75) Inventor: Kazuyuki Kuratomi, Sakura (JP)

(73) Assignee: Canon Kabushiki Kaisha (JP)

(*) Notice: Subject to any disclaimer, the term of this patent is extended or adjusted under 35 U.S.C. 154(b) by 340 days.

(21) Appl. No.: 13/031,790

(22) Filed: Feb. 22, 2011

(65) Prior Publication Data
US 2011/0216321 A1    Sep. 8, 2011

(30) Foreign Application Priority Data
Mar. 4, 2010    (JP) .................................. 2010-047238

(51) Int. Cl.
*G03B 21/20* (2006.01)
(52) U.S. Cl.
USPC ............................................ 353/85; 362/295
(58) Field of Classification Search
USPC .. 353/85; 40/541; 352/198; 355/67; 362/295; 399/38
See application file for complete search history.

(56) References Cited

U.S. PATENT DOCUMENTS

| 5,386,250 | A | 1/1995 | Guerinot |
| 2005/0047134 | A1* | 3/2005 | Mueller et al. ................. 362/231 |
| 2006/0022214 | A1* | 2/2006 | Morgan et al. ................. 257/99 |
| 2006/0044952 | A1 | 3/2006 | Penn et al. |
| 2009/0109409 | A1 | 4/2009 | Haraguchi et al. |

FOREIGN PATENT DOCUMENTS

| EP | 0 766 481 A2 | 4/1997 |
| JP | 5-313115 A | 11/1993 |
| JP | 9-096786 A | 4/1997 |

OTHER PUBLICATIONS

Extended European Search Report issued in corresponding European Patent Application No. 11001504.7 dated May 11, 2011.

* cited by examiner

*Primary Examiner* — Seung C Sohn
(74) *Attorney, Agent, or Firm* — Rossi, Kimms & McDowell LLP (57) ABSTRACT

A projection display apparatus 100, 200 includes a plurality of light sources 3a, 3b, a plurality of light source power supplies 2a, 2b configured to supply electric power to the plurality of light sources, and a lighting controller 6 configured to control the plurality of light source power supplies so as to select and light at least one light source of the plurality of light sources in accordance with each lighting history of the plurality of light sources. The lighting controller 6 lights a predetermined light source continuously after the lighting history of one of the plurality of light sources reaches a predetermined value, and the lighting controller 6 lights a light source other than the predetermined light source after the lighting history of the predetermined light source reaches a predetermined lifetime value.

4 Claims, 6 Drawing Sheets

PROJECTION DISPLAY APPARATUS HAVING PLURAL LIGHT SOURCES

BACKGROUND OF THE INVENTION

1. Field of the Invention

The present invention relates to a projection display apparatus having a plurality of light sources.

2. Description of the Related Art

Previously, in a projection display apparatus having a plurality of light sources, a projection may be performed by lighting light sources whose number is smaller than the total number of light sources in some cases. For example, in the projection display apparatus having two light sources, the projection is performed by using one light source to be able to extend the time capable of performing the projection simply twice without exchanging the light sources as the projection display apparatus. In addition to extend the time capable of performing the projection in the projection display apparatus, the projection can be continued by switching the light sources without exchanging the light sources as the projection display apparatus when the lifetime of the light source comes during the use in a conference or the like.

In Japanese Patent Laid-Open No. 09-096786, a technology in which the light source is selected to be used so that the accumulated lighting time of each light source is averaged to be able to exchange each light source around the same time is proposed.

However, as the technology proposed in Japanese Patent Laid-Open No. 09-096786, when the light source is selected to be used so that the accumulated lighting time of each light source is averaged, there is a merit that can exchange the light sources around the same time, but there is also a demerit that the lifetime of each light source comes around the same time. For example, when the lifetime of the light source comes during the use of a conference or the like, the projection display apparatus can be continuously used by switching the light sources. However, the lifetime of the switched light source may also come. When the projection display apparatus is installed on a ceiling or the like, it takes much time to exchange the light sources. In this case, the lifetime of the remaining light source also comes before the light source whose lifetime has come is exchanged, and the projection display apparatus may not be able to be used until the light source is exchanged.

SUMMARY OF THE INVENTION

The present invention provides a projection display apparatus configured so that lifetimes of a plurality of light sources are shifted from each other can be provided.

A projection display apparatus as one aspect of the present invention includes a plurality of light sources, a plurality of light source power supplies configured to supply electric power to the plurality of light sources, and a lighting controller configured to control the plurality of light source power supplies so as to select and light at least one light source of the plurality of light sources in accordance with each lighting history of the plurality of light sources. The lighting controller lights a predetermined light source continuously after the lighting history of one of the plurality of light sources reaches a predetermined value, and the lighting controller lights a light source other than the predetermined light source after the lighting history of the predetermined light source reaches a predetermined lifetime value.

Further features and aspects of the present invention will become apparent from the following description of exemplary embodiments with reference to the attached drawings.

DESCRIPTION OF THE PREFERRED EMBODIMENTS

Exemplary embodiments of the present invention will be described below with reference to the accompanied drawings. In each of the drawings, the same elements will be denoted by the same reference numerals and the duplicate descriptions thereof will be omitted.

Embodiment 1

Figure 1:
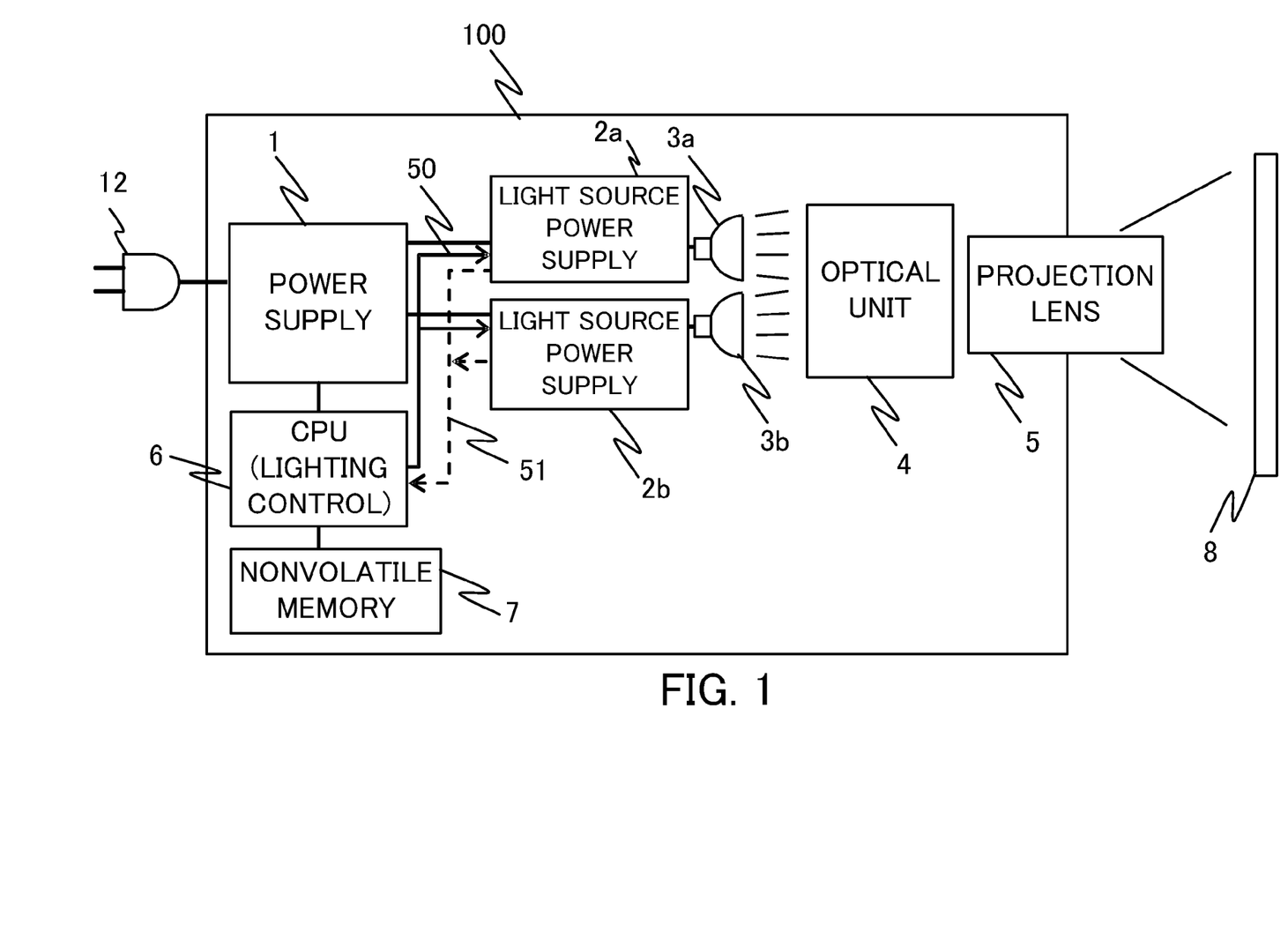
FIG. 1 is a configuration diagram of a projection display apparatus in Embodiment 1.

First of all, Embodiment 1 of the present invention will be described. FIG. 1 is a configuration diagram of a projection display apparatus 100 in the present embodiment. In FIG. 1, reference numeral 1 denotes a power supply, which converts an AC power supply inputted via an AC cable 12 into a DC power supply to be supplied as a power supply of a control system such as a CPU or a power supply of a light source. Reference numerals 2a and 2b are light source power supplies (ballast), which supply a predetermined power supply to respective light sources. Reference numerals 3a and 3b denote light sources. In the present embodiment, the projection display apparatus 100 includes the two light sources 3a and 3b, but the present embodiment is not limited to this and a plurality of light sources, i.e. at least two light sources, may be provided. Therefore, the present embodiment is also applicable to a projection display apparatus having three light sources or more.

An optical unit 4 contains an illumination optical element, liquid crystal panels, a color separating unit, a color combining unit, and the like (not shown). The illumination distributions of lights from the light sources 3a and 3b are homogenized by the illumination optical element, and the lights are separated into three colors of RGB by the color separating unit. The separated lights are illuminated on the liquid crystal panels of RGB respectively, and it changes transmittance (reflectance) in accordance with a video signal. Transmitted light (reflected light) of each of RGB is combined by the color combining unit to generate an image. A projection lens 5 extends the image generated by the optical unit 4 to project it onto a screen 8 in accordance with a zoom magnification.

A CPU 6 (a lighting controller) outputs a lighting control signal 50 to the light source power supplies 2a and 2b so as to light both or one of the light sources 3a and 3b in accordance with an operation mode of the projection display apparatus 100. For example, in a projection mode in which brightness is required, the CPU 6 outputs the lighting control signal 50 to both the light source power supplies 2a and 2b to light both the light sources 3a and 3b. Additionally, the CPU 6 performs a control of the whole of the projection display apparatus 100 such as an ON/OFF control of the power supply 1. A non-volatile memory 7 is coupled to the CPU 6, which stores a lighting history such as an accumulated lighting time or the number of lighting of each of the light sources 3a and 3b.

Figure 2:
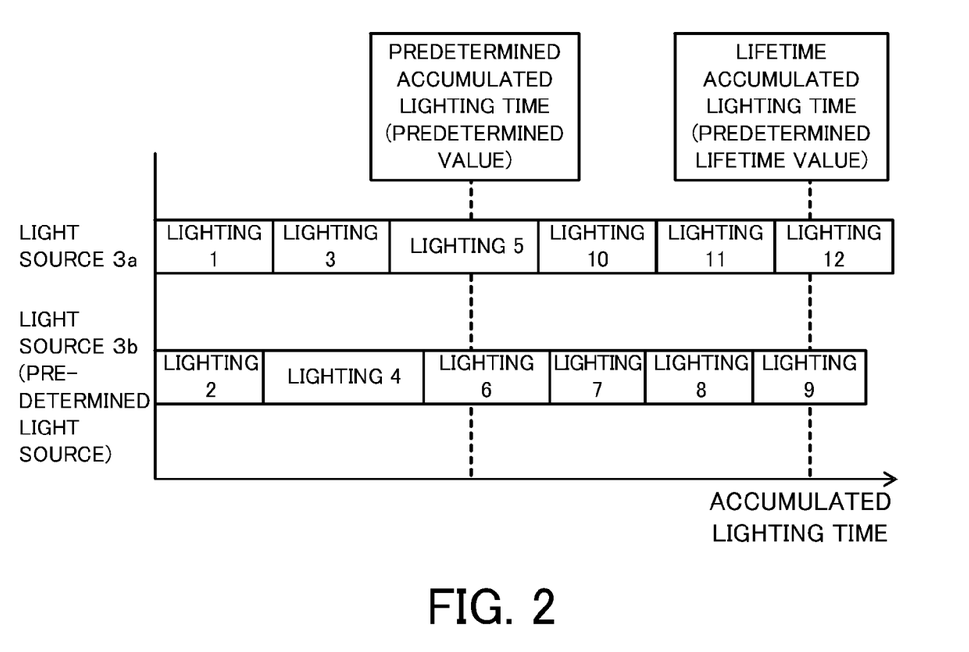
FIG. 2 is a diagram illustrating a lighting order of a plurality of light sources and an accumulated lighting time of each light source in Embodiment 1.

Next, referring to FIG. 2, the operation of the projection display apparatus 100 in the present embodiment will be described. FIG. 2 is a diagram illustrating a lighting order of a plurality of light sources 3a and 3b and an accumulated lighting time of each of the light sources 3a and 3b. In FIG. 2, a predetermined accumulated lighting time, i.e. a predetermined value, is an accumulated lighting time that is set as a time after the passage of a predetermined accumulated lighting time. A lifetime accumulated lighting time, i.e. a predetermined lifetime value, is an accumulated lighting time by which a lifetime of each of the light sources 3a and 3b are determined. As the light sources 3a and 3b of the projection display apparatus 100, for example a high-pressure mercury lamp is used. However, if the light sources 3a and 3b are used in a time longer than a guarantee time, there is a possibility that the light sources 3a and 3b burst. Therefore, the projection display apparatus 100 stores the accumulated lighting times of the light sources 3a and 3b in the nonvolatile memory 7. When the time reaches the lifetime accumulated lighting time, i.e. the predetermined lifetime value, by which the lifetimes of the light sources 3a and 3b are determined, the CPU 6 informs a user of the necessity of exchanging the light sources 3a and 3b. Instead, the CPU 6 may also display an alert of an error without lighting the light sources 3a and 3b.

In FIG. 2, "Lighting 1" to "Lighting 12" indicate a lighting order of the light sources 3a and 3b in a case where the power supply 1 of the projection display apparatus 100 is turned on, i.e. a case where the ON/OFF of the power supply 1 is repeated. In other words, the light source 3a lights up when the power supply 1 first turned on, and the light source 3b lights up when the power supply 1 is turned on again after it is turned off.

In "Lighting 1" to "Lighting 4", both the light sources 3a and 3b do not reach the predetermined accumulated lighting time, i.e. the predetermined value. Therefore, the CPU 6 selects one of the light sources 3a and 3b in accordance with a normal method of selecting the light source. In the embodiment, the normal method of selecting the light source means that a selecting method in accordance with a normal operation is performed without performing a selecting method considering the lifetimes of the light sources 3a and 3b, and for example it means that the light sources 3a and 3b are selected alternately.

In "Lighting 5", at the time of selecting the light source 3a, the light source 3a does not reach the predetermined accumulated lighting time, i.e. the predetermined value. Therefore, the CPU 6 selects the light source 3a in accordance with the normal method of selecting the light source. However, if the light source 3a lights up for a while, the accumulated lighting time of the light source 3a exceeds the predetermined accumulated lighting time, i.e. the predetermined value. When the accumulated lighting time of the light source 3a reaches the predetermined accumulated lighting time, i.e. the predetermined value, one of the light sources 3a and 3b is preferentially selected in the subsequent selections of the light source. In other words, when the power supply 1 is turned on after the predetermined accumulated lighting time, the CPU 6 performs a control so that only one light source, i.e. a predetermined light source, of the light sources 3a and 3b lights up and the normal method of selecting the light source, i.e. the light sources 3a and 3b are selected alternately in the present embodiment, is not performed. In the present embodiment, the light source 3b is set as one light source, i.e. the predetermined light source, of the light sources 3a and 3b, but on the contrary the light source 3a may also be set as the predetermined light source.

In the present embodiment, since the light source 3b is set as the predetermined light source, the CPU 6 performs a control so that only the light source 3b lights up after "Lighting 6", i.e. after the passage of the predetermined accumulated lighting time, and the normal method of selecting the light source as described above is not performed. As illustrated in FIG. 2, when the lighting of the light source 3b continues, i.e. "Lighting 6" to "Lighting 9", after the passage of the predetermined accumulated lighting time, the light source 3b reaches the lifetime accumulated lighting time (the predetermined lifetime value) in "Lighting 9". In this case, since the light source 3b is determined to reach the lifetime, the light source 3b cannot light up after "Lighting 10". Therefore, the CPU 6 performs a control so that the light source 3a that has not been used after the passage of the predetermined accumulated lighting time lights up.

Thus, the CPU 6 controls the light source power supplies 2a and 2b so that at least one of the light sources 3a and 3b is selected to light the one light source in accordance with each of lighting histories of the light sources 3a and 3b. Specifically, the CPU 6 continuously lights a predetermined one light source (for example, the light source 3b) after the lighting history of one light source (for example, the light source 3a) of the light sources 3a and 3b reaches a predetermined value. The CPU 6 also lights a light source (for example, the light source 3a) other than a predetermined light source after the lighting history of the predetermined light source (for example, the light source 3b) reaches a predetermined lifetime value.

Figure 3:
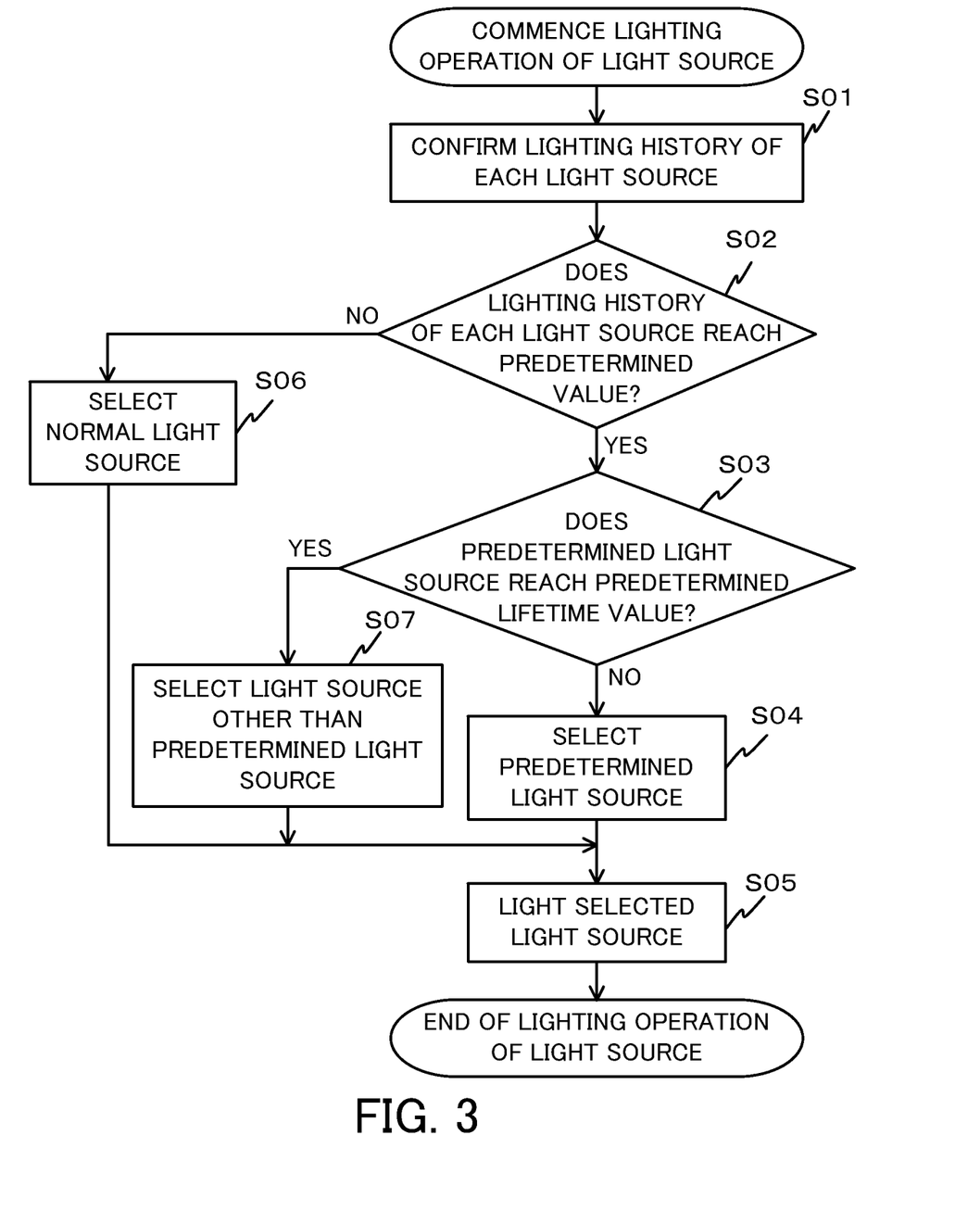
FIG. 3 is a flowchart of a lighting operation of light sources in Embodiment 1.

Next, referring to FIG. 3, the lighting operation of the light source in the present embodiment will be described in detail. FIG. 3 is a flowchart of the lighting operation of the light source in the present embodiment. The projection display apparatus 100 starts the lighting operation of the light source when the power supply 1 is turned on. The CPU 6 accesses the nonvolatile memory 7 to confirm the lighting histories of the light sources 3a and 3b (Step S01). In the present embodiment, the accumulated lighting time is used as the lighting histories of the light sources 3a and 3b, but for example the number of accumulated lighting may also be used as the lighting histories.

Next, the CPU 6 determines whether or not each of the accumulated lighting times of the light sources 3a and 3b reaches the predetermined accumulated lighting time, i.e. the predetermined value (Step S02). When it does not reach the predetermined accumulated lighting time, i.e. the predetermined value, the CPU 6 performs the normal method of selecting the light source (Step S06). On the other hand, when one of the light sources 3a and 3b reaches the predetermined accumulated lighting time, i.e. the predetermined value, the CPU 6 determines whether or not the predetermined light source reaches the lifetime accumulated lighting time, i.e. the predetermined lifetime value (Step S03).

In Step S03, when the predetermined light source does not reach the lifetime accumulated lighting time, i.e. the predetermined lifetime value, a predetermined light source that is previously set is selected (Step S04). On the other hand, when the predetermined light source reaches the lifetime accumulated lighting time, i.e. the predetermined lifetime value, the predetermined light source is evaluated to be in a state of the lifetime and therefore a light source other than the predetermined light source is selected (Step S04). The CPU 6 outputs the lighting control signal 50 as a lighting command to a lighting light source (a light source power supply) selected in one of Steps S04, S06, and S07 described above to light the selected light source (Step S05). According to the above procedure, the lighting operation of the light source is finished.

A time from the lifetime of the predetermined light source to the lifetime of the light source other than the predetermined light source can be ensured by selecting the light source as described above. Therefore, the possibility that all of the plurality of light sources reach the lifetime, i.e. the predetermined lifetime value, around the same time can be reduced.

According to the present embodiment, the predetermined accumulated lighting time, i.e. the predetermined value, is set in accordance with the use of the projection display apparatus to be able to ensure the time required for exchanging the light sources with little waste of an available time up to the time of exchanging the light sources, and a service performance is improved. For example, when the projection display apparatus is installed on a ceiling or the like by the use in a large conference room, it is not easy to exchange the light sources. In some cases, the exchange may be asked to a person of a company in charge of maintenance instead of being exchanged by a user himself. In such a use, the time of exchanging the light sources needs to be longer, but a difference between the predetermined accumulated lighting time, i.e. the predetermined value, and the lifetime accumulated lighting time, i.e. the predetermined lifetime value, is given to be able to perform a projection using a light source other than the predetermined light source during the time needed for exchanging the light sources.

In a use of mainly carrying the projection display apparatus such as a portable device, it is relatively easy to exchange the light sources. Therefore, compared with the above case, it is not necessary to take a long time for the exchange. In this case, the difference between the predetermined accumulated lighting time, i.e. the predetermined value, and the lifetime accumulated lighting time, i.e. the predetermined lifetime value, is reduced to be able to extend the available time as the projection display apparatus up to near the lifetime of the light source.

In the projection display apparatus 100 of the present embodiment, during a time from the achievement of the predetermined accumulated lighting time, i.e. the predetermined time, to the achievement of the lifetime accumulated lighting time of the predetermined light source, i.e. the predetermined lifetime value, the predetermined light source is always selected. Actually, however, the predetermined light source does not light up in some cases even if a lighting command is provided to the predetermined light source. For example, when the time from turning off a previous light source to turning on a next light source is short and the temperature of the light source is not lowered, the light source does not light up in some cases even if the lighting command is provided. When the number of turning on and off of the light source is large due to the extremely-short lighting time, the lifetime becomes short even if the light source is in a guarantee accumulated lighting time, and the light source may not light up in some cases. When the predetermined light source does not light up as described above, a light source other than the predetermined light source lights up to be able to perform a projection by the projection display apparatus. Hereinafter, referring to FIG. 4, such a lighting operation of the light source will be described.

Figure 4:
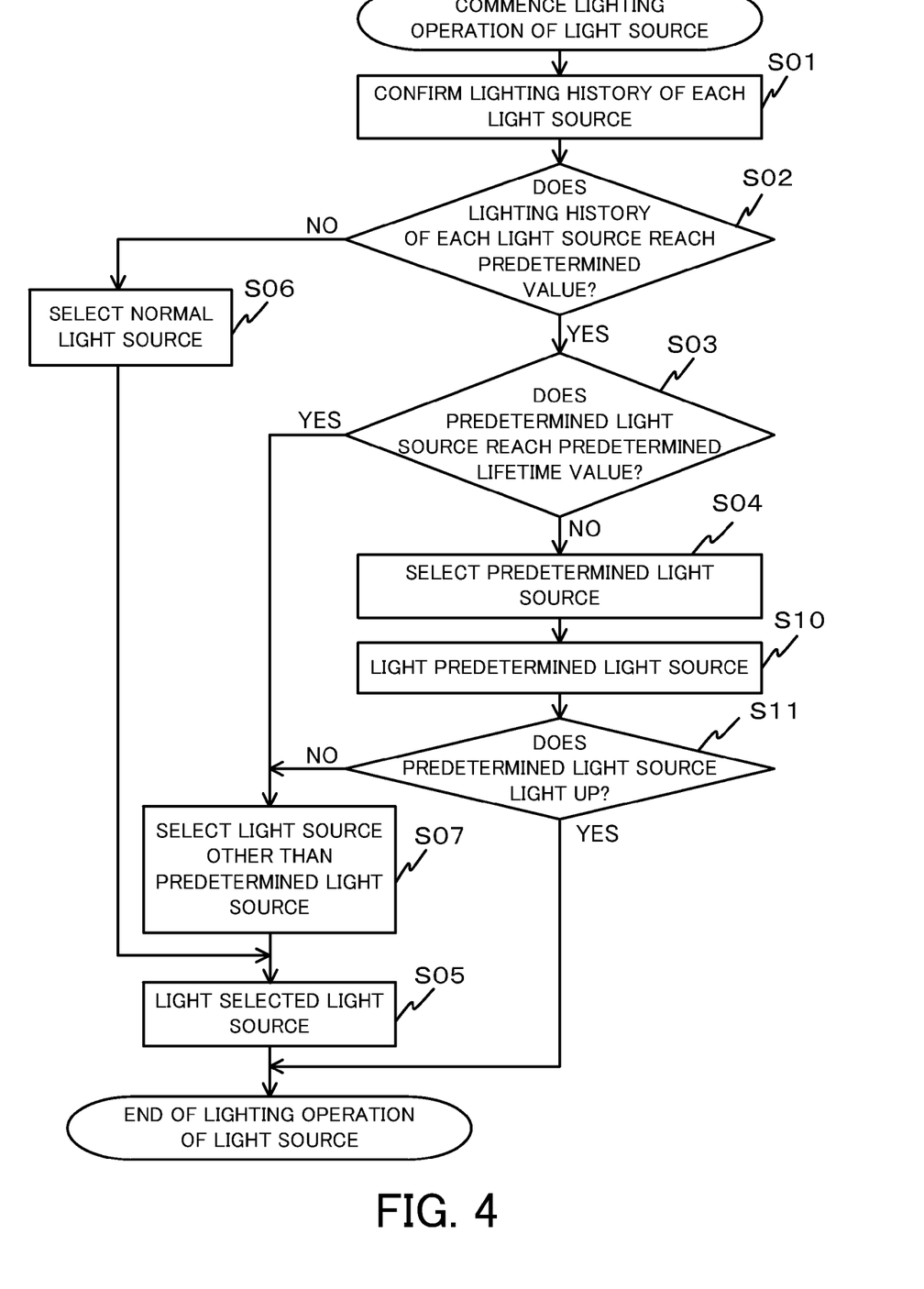
FIG. 4 is a flowchart of a lighting operation of light sources that is another example of Embodiment 1.

FIG. 4 is a flowchart of the lighting operation of the light source that is another example of the present embodiment. FIG. 4 is, compared with the flowchart of FIG. 3, different in that processes of Steps S10 and S11 are added after selecting the predetermined light source (Step S04). The description relating to the same processes as those of the flowchart in FIG. 3 will be omitted.

When the predetermined light source is selected (Step S04), the CPU 6 outputs the lighting control signal 50 as the lighting command to the light source power supply 2b that is the predetermined light source (Step S10). The light source power supply 2b informs the CPU 6 of the result as to whether or not the light source 3b lights up by a lighting detection signal 51. The CPU 6 performs a corresponding process (Step S11) in accordance with the result of the lighting detection signal 51 informed by the light source power supply 2b (the light source 3b). When the light source 3b is really turned on, the lighting operation of the light source is finished. On the other hand, when the light source 3b does not light up even if the lighting command is received, a light source other than the predetermined light source (the light source 3a in the present embodiment) is selected to light up (Step S07).

Thus, the CPU 6 performs a control so that a light source other than a predetermined one light source (for example, the light source 3a) lights up when the predetermined light source does not light up even if the lighting command is outputted to the light source power supply that supplies an electric power to the predetermined light source (for example, the light source 3b).

According to the present embodiment, whether or not the predetermined light source lights up is detected to be processed, and therefore the projection display apparatus can continue an appropriate projection even if the predetermined light source does not light up due to some sort of influences.

Embodiment 2

Figure 5:
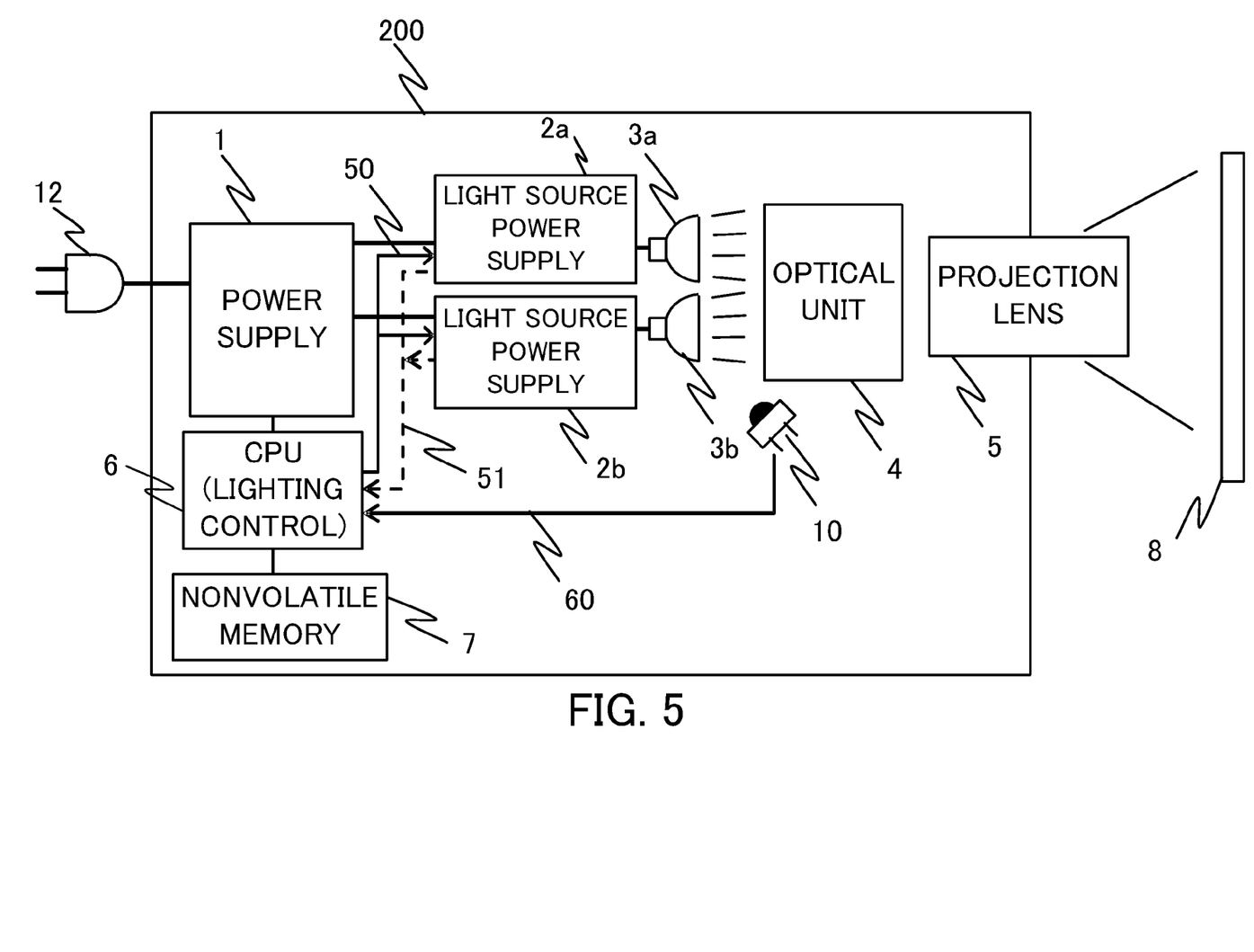
FIG. 5 is a configuration diagram of a projection display apparatus in Embodiment 2.

Next, Embodiment 2 of the present invention will be described. FIG. 5 is a configuration diagram of a projection display apparatus 200 in the present embodiment. Although each of the accumulated lighting times of the light sources 3a and 3b are used as a lighting history in Embodiment 1, each of light intensities of the light sources 3a and 3b is used as the lighting history in the present embodiment. Similarly to the accumulated lighting time or the number of lightings, the light intensity is also one of indexes that indicate a lifetime of each of the light sources 3a and 3b. In the present embodiment, the projection display apparatus 200 in which an light intensity sensor 10 measuring each light intensity of the light sources 3a and 3b is provided and the light intensity of the light source is used as the lighting history of the light source will be described.

As illustrated in FIG. 5, the projection display apparatus 200 is, compared with the projection display apparatus 100 of Embodiment 1, configured by adding the light intensity sensor 10 (light intensity measurement unit) that measures each of light intensities of the light sources 3a and 3b and a light intensity level signal 60 that is outputted from the light intensity sensor 10. The light intensity sensor 10 is, for example, installed in the projection display apparatus 200. In this case, the light intensity sensor 10 measures leak lights of the light sources 3a and 3b. Instead of installing the light intensity sensor 10 in the projection display apparatus 200 to measure the light intensity, the light intensity sensor may also be disposed so as to face an outside of the projection display apparatus 200 to measure projection light onto the screen 8 or the like.

The light intensity level signal 60 that is outputted from the light intensity sensor 10 is inputted to the CPU 6. The light intensity level signal 60 (analog signal) that is inputted to the CPU 6 is converted by an A/D converter (not shown) into a digital value, and is sequentially stored in the nonvolatile memory 7. When the lighting operation of the light source is commenced, the CPU 6 accesses the nonvolatile memory 7, and confirms a value of a light intensity at the previous lighting time as each of the lighting histories of the light sources 3a and 3b. In the present embodiment, a fundamental operation or a processing procedure other than the use of the light intensity of the light source as the lighting history of the light source is the same as that of Embodiment 1.

Figure 6:
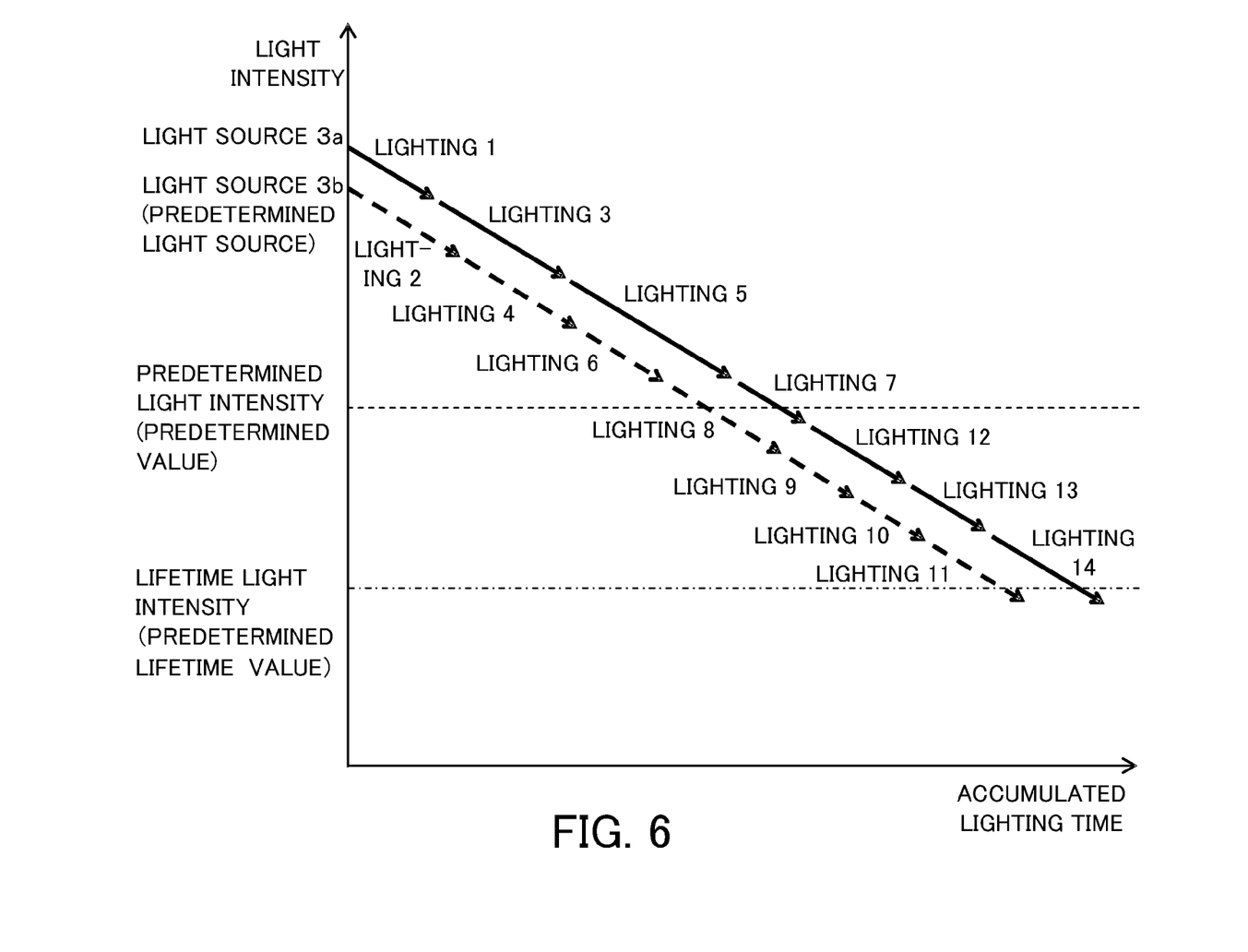
FIG. 6 is a diagram illustrating a lighting order of a plurality of light sources and a relationship between a light intensity and an accumulated lighting time of each light source in Embodiment 2.

FIG. 6 is a diagram illustrating a lighting order of a plurality of light sources and a relationship between the light intensity and the accumulated lighting time of each light source. In the present embodiment, a predetermined light intensity is used as a predetermined value, and a lifetime light intensity is used as a predetermined lifetime value. As illustrated in FIG. 6, in "Lighting 1" to "Lighting 6", both the light intensities of the light sources 3a and 3b are equal to or greater than the predetermined light intensity. Therefore, one of the light sources 3a and 3b is selected in accordance with a normal method of selecting the light source. In the present embodiment, as the normal method of selecting the light source, the light source is selected so that the light sources 3a and 3b alternately light up similarly to Embodiment 1.

When the light source is selected in "Lighting 7", each of the light intensities of the light sources 3a and 3b are still equal to or greater than the predetermined light intensity, i.e. the predetermined value. Therefore, the light source 3a is selected in accordance with the normal method of selecting the light source. However, when the light source 3a continuously lights up, the light intensity value of the light source 3a becomes smaller than the predetermined light intensity. When the light intensity of the light source 3a becomes smaller than the predetermined light intensity, the predetermined light source (the light source 3b) is selected as a lighting light source in subsequently selecting the light source. Therefore, the predetermined light source (the light source 3b) is continuously selected in "Lighting 8" to "Lighting 11".

As illustrated in FIG. 6, when the light intensity of the predetermined light source (the light source 3b) becomes smaller than the lifetime light intensity, i.e. the predetermined lifetime value in "Lighting 11", a light source other than the predetermined light source (the light source 3b), i.e. the light source 3a is selected as the lighting light source in "Lighting 12" or later. In the present embodiment, the light source 3a has a margin from the predetermined light intensity to the lifetime light intensity. Therefore, the risk that both the lifetimes of the light sources 3a and 3b come around the same time can be suppressed.

In Embodiment 2, although the light intensity sensor 10 that measures the light intensity of the light source is provided and the light intensity of the light source is used as the lighting history, instead of this, a change rate of the light intensity may also be used as the lighting history. As Embodiment 1, a control of selecting the light source other than the predetermined light source may also be added in a case where the lifetime of the predetermined light source comes early or the predetermined light source does not light up by a relighting control in a short period of time.

As described above, according to each of the above embodiments, when a projection is performed by lighting light sources whose number is smaller than the total number of the light sources of the projection display apparatus having the plurality of light sources, the projection display apparatus configured so that the lifetimes of the plurality of light sources are shifted from each other can be provided. Therefore, the property of the projection display apparatus capable of performing the projection for a long time and also the service performance of exchanging the light sources can be improved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-047238, filed on Mar. 4, 2010, which is hereby incorporated by reference herein in its entirety.

What is claimed is:

1. A projection display apparatus comprising:
   a plurality of light sources;
   a plurality of light source power supplies configured to supply electric power to the plurality of light sources; and
   a lighting controller configured to control the plurality of light source power supplies so as to select and light at least one light source of the plurality of light sources in accordance with lighting history of each of the plurality of light sources,
   wherein the lighting controller lights a second of the plurality of light sources continuously after the lighting history of a first of the plurality of light sources reaches a predetermined value,
   wherein the lighting controller lights the first light source after the lighting history of the second light source reaches a predetermined lifetime value.

2. The projection display apparatus according to claim 1, wherein the lighting controller performs a control so as to light the first light source when the second light source does not light up even if a lighting command is outputted to the light source power supply which supplies the electric power to the second light source.

3. The projection display apparatus according to claim 1, wherein the lighting history is one of an accumulated lighting time and the number of lightings of each of the plurality of light sources.

4. The projection display apparatus according to claim 1, further comprising a light intensity measurement unit configured to measure a light intensity of each of the plurality of light sources,
   wherein the lighting history is one of the light intensity and a change rate of the light intensity of each of the plurality of light sources.

* * * * *